United States Patent [19]

Iida

[11] 4,295,454

[45] Oct. 20, 1981

[54] HEATED FUEL INTAKE SYSTEM IN AUTOMOBILE ENGINE

[75] Inventor: Yoshihiko Iida, Hiroshima, Japan

[73] Assignee: Toyo Kogyo Co., Ltd., Hiroshima, Japan

[21] Appl. No.: 124,239

[22] Filed: Feb. 25, 1980

[30] Foreign Application Priority Data

Feb. 24, 1979 [JP] Japan .................................. 54/21175

[51] Int. Cl.³ ............................................ F02M 31/00
[52] U.S. Cl. ..................................... 123/556; 123/552
[58] Field of Search ................... 123/556, 552; 236/13, 236/86, 101 C

[56] References Cited

U.S. PATENT DOCUMENTS

| | | | |
|---|---|---|---|
| 3,513,817 | 5/1970 | Kearley | 123/556 |
| 4,112,896 | 9/1978 | Akado | 123/556 |
| 4,244,343 | 1/1981 | Yamaguchi | 123/556 |
| 4,259,936 | 4/1981 | Bach | 123/552 |

Primary Examiner—Ronald H. Lazarus
Attorney, Agent, or Firm—Wenderoth, Lind & Ponack

[57] ABSTRACT

A heated fuel intake system for an internal combustion engine for introducing warmed air to the engine and air to a fuel supply circuit in a carburetor comprises a heat stove from which the warmed air is introduced into an air cleaner to heat the air to a temperature equal to or higher than a first predetermined temperature. The introduction of the warmed air from the heat stove is interrupted by a first valve unit when the temperature of the air to be fed to the engine has exceeded the temperature equal to or higher than the first predetermined temperature. The introduction of the warmed air into the air cleaner is again initiated when the temperature of the air inside the air cleaner becomes a value equal to a second predetermined temperature higher than the first predetermined temperature and, simultaneously therewith, an air-fuel ratio leaner is operated to introduce an additional air to compensate for the increased richness of the combustible mixture.

13 Claims, 4 Drawing Figures

HEATED FUEL INTAKE SYSTEM IN AUTOMOBILE ENGINE

BACKGROUND OF THE INVENTION

The present invention generally relates to a fuel intake system in an automobile internal combustion engine and, more particularly, to an improved fuel intake system for automatically controlling the temperature of an incoming air to be introduced into one or more engine cylinders together with fuel.

In order to improve, or stabilize, the combustion condition in the engine cylinders, some automobiles have employed a heated fuel intake system so designed as to heat the incoming air when the temperature of the latter is lower than a predetermined operating temperature, the heating of the incoming air being interrupted when the temperature of the incoming air so heated subsequently becomes higher than the predetermined operating temperature. In this prior art system, the predetermined operating temperature at which the heating system operates is generally within the range of 30° to 50° C. and is determined in consideration of the incompatible facts that evaporation and/or atomization of fuel to be mixed with the incoming air to provide a combustible air-fuel mixture can be facilitated when the temperature of the incoming air is relatively high and that the charge efficiency for the engine cylinders can be improved when the temperature of the incoming air is relatively low.

The prior art heated fuel intake system of the type referred to above is effective only when used under the circumstances where the ambient temperature, which may be the temperature either inside or outside the automobile engine compartment, is lower than the predetermined operating temperature. Conversely, when the prior art heated fuel intake system is used under the circumstances where the ambient temperature higher than the predetermined operating temperature prolonges substantially, the temperature of the incoming air is correspondingly high, rendering the heating system unable to maintain the temperature of the incoming air at a constant value corresponding to the predetermined operating temperature.

In addition, since the mixing ratio of the air-fuel mixture to be supplied into the engine cylinders is generally set to the stoichiometric value which is determined by taking the predetermined operating temperature into consideration as one of the determinant factors, the increased temperature of the incoming air higher than the predetermined operating temperature would reduce the mixing ratio, that is, enrich the air-fuel mixture, to such an extent that satisfactory combustion of the air-fuel mixture will no longer take place in the engine cylinders, thereby adversely affecting the drivability of the automobile paralleled with the substantially increased amount of noxious unburned components of the exhaust gases. The higher the ambient temperature, the more often is this occurrence enhanced.

In order to avoid the drawbacks inherent in the prior art heated fuel intake system of the type referred to above, the U.S. Pat. No. 4,112,896, patented on Sept. 12, 1978, discloses a heated fuel intake system which comprises a thermostatic valve for introducing warmed air into the engine and air to a slow-port passage of a carburetor. The thermostatic valve comprises a valve casing defining therein first and second compartment. The first compartment has a first valve member for controlling the introduction of the intake vacuum or the atmospheric pressure to a negative pressure motor mounted on a throat or snorkel tube of an air cleaner. The second compartment has a second valve member for controlling the communication between a float chamber and the slow-port passage of the carburetor when the temperature of the air introduced into the engine exceeds a preset value so as to prevent excessive richness of an air-fuel mixture flowing towards the engine.

In the system disclosed in the above mentioned U.S. patent, since the air is introduced into the slow-port passage when the air inside the air cleaner exceeds the preset value, it involves a such a problem that, because the adjusted air-fuel ratio merely corresponds to a value appropriate for the engine to operate with the air heated to such preset temperature, the combustible air-fuel mixture tends to be enriched or leaned once one or both of the temperature of the air so introduced and the ambient temperature diverge from the preset temperature.

SUMMARY OF THE INVENTION

Accordingly, the present invention has been made in view to substantially eliminating the above described disadvantages and inconveniences inherent in the prior art systems and is intended to provide an improved heated fuel intake system reliable in operation and effective to improve or stabilize the drivability of the engine.

Another object of the present invention is to provide an improved heated fuel intake system of the type referrd to above which is also effective to reduce the amount of unburned components of exhaust gases emitted from the exhaust system of the engine.

A further object of the present invention is to provide an improved heated fuel intake system of the type referred to above which does not utilize such a complicated valve assembly as used in the prior art systems and which can, therefore, be manufactured at reduced cost.

These and other objects of the present invention can be accomplished by providing a heated fuel intake system comprising a first means for applying heat energies from a source of such heat energies to the air flowing towards the engine to heat such air to a first predetermined temperature and for interrupting the application of the heat energies to the air when the temperature of the air has become a value equal to or higher than the first predetermined temperature. A second heat energy applying means is used, which is operable when the temperature of the air flowing towards the engine has attained a value equal to or higher than a second predetermined temperature higher than the first predetermined temperature for applying the heat energies to the air to heat the latter to a third predetermined temperature higher than the second predetermined temperature and for interrupting the application of the heat energies when the temperature of the air has become a value equal to or higher than the third predetermined temperature.

The system further comprises means operable in synchronism with the second applying means for compensating for the increased richness of the combustible mixture which would occur when the air flowing towards the engine becomes hot so sufficiently as to bring the second applying means into an operative position to apply the heat energies to the air.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
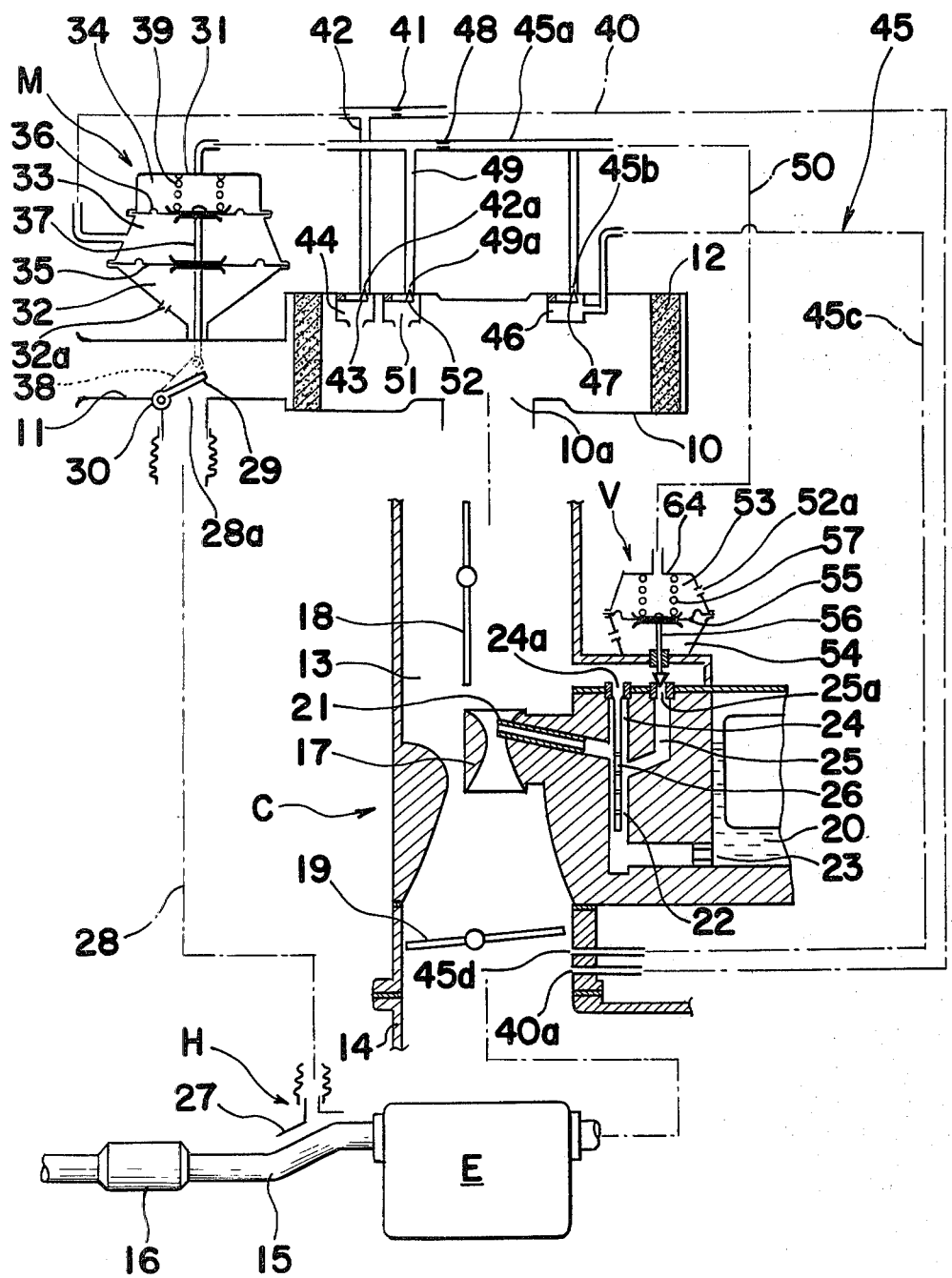
FIG. 1 is a schematic sectional view of an automobile fuel intake system incorporated with a heated fuel intake system according to a first preferred embodiment of the present invention.

Before the description of the present invention proceeds, it is to be noted that like parts are designated by like reference numerals throughout the accompanying drawings.

Figure 2:
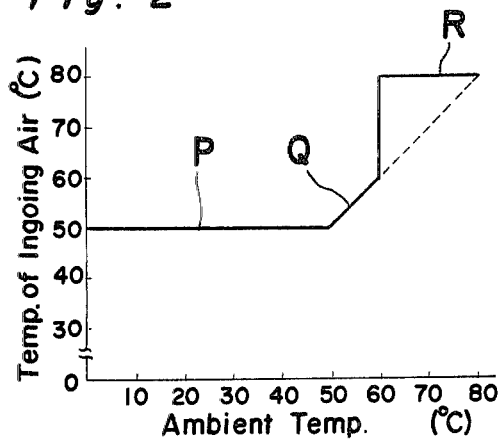
FIG. 2 is a graph showing variation in temperature of the incoming air to be fed to the engine.
Figure 3:
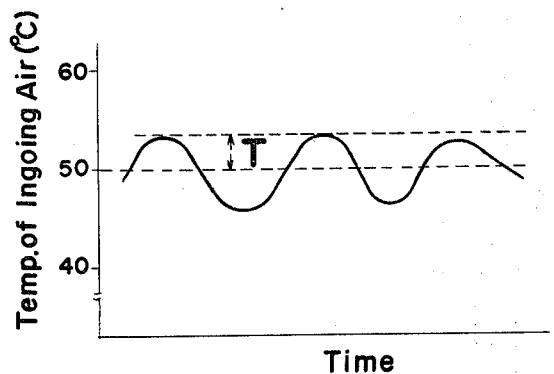
FIG. 3 is a graph showing variation of the temperature of the incoming air relative to the ambient temperature as controlled by the heated fuel intake system of the present invention.

Referrng to FIGS. 1 to 3 and, particularly, to FIG. 1, an air cleaner 10 having a snorkel tube 11 radially outwardly extending therefrom and an annular filtering element 12 installed inside the air cleaner 10 is mounted on a carburetor C with an opening 10a communicated to an air horn 13 of the carburetor C. The air horn 13 of the carburator C is in turn communicated through an intake manifold 14 to an automobile internal combustion engine E, said internal combustion engine E having an exhaust manifold 15 for the discharge of exhaust gases resultant of combustion of air-fuel mixture inside the engine E. The exhaust manifold 15 extending outwardly from the engine E is communicated to the atmosphere through an exhaust gas purifying unit 16 of any known construction which may be either one or both of a catalytic converter and an afterburner.

The carburetor C has a venturi 17 positioned inside the air horn 13, a choke valve 18 pivotally supported within the air horn 13 at a position upstream of the venturi 17 with respect to the direction of flow of the air-fuel mixture towards the engine E, and a throttle valve 19 supported for pivotal movement between substantially closed and opened position within the air horn 13 at a position downstream of the venturi 17. The carburetor C also has a float bowl 20 for the storage of a constant amount of fuel to be supplied towards a main nozzle 21, supported by the venturi 17 in any known manner, through a high-speed fuel passage 22 having one end communicated to the float bowl 20 through a main metering orifice 23 and the other end communicated to the main nozzle 21. The high-speed fuel passage 22 has its substantially intermediate portion communicated to a portion of the air horn 13 upstream of the venturi 17 through a main air bleed passage 24 ramified from the fuel passage 22 and communicated to the air horn 13 through a main air bleed port 24a, and an auxiliary air bleed passge 25 ramified from the fuel passage 22 and communicated to the air horn 13 through an auxiliary air bleed port 25a. The main air bleed passage 24 has an emulsion tube 26 inserted therein and protruding into the fuel passage 22.

The construction so far described of the air cleaner 10 and the carburetor C is well known to those skilled in the art and, therefore, no further details thereof will be herein reiterated. In addition, it is to be noted that the path leading from the opening of the snorkel tube 11 in communication with the atmosphere to the engine E through the air cleaner 10, the air horn 13 and the intake manifold 14 is generally referred to as a fuel intake passage for the purpose of description of the present invention.

The heated fuel intake system embodying the present invention comprises a heat stove H composed of a shroud tube 27 positioned around the exhaust manifold 15 at a position between the purifying unit 16 and the engine E. The heat stove H is so designed as to permit air from the atmosphere to enter an annular space defined between the exhaust manifold 15 and the shroud tube 27 and, simultaneously, to be heated by the heat energies evolved in the wall of the exhaust manifold 15 during the operation of the engine E. The annular space between the shroud tube 27 and the exhaust manifold 15 is communicated to the snorkel tube 11 through a hot air pipe shown by the chain line 28, said hot air pipe 28 having one end connected to the shroud tube 27 and the other end connected to the snorkel tube 11 and opening at 28a into the interior of the snorkel tube 11. The opening 28a of the hot air pipe 28 is adapted to be selectively closed and opened by a valve plate 29 positioned inside the snorkel tube 11 and supported on a pivot shaft 30 for pivotal movement between an opened position, in which the opening 28a of the hot air pipe 28 is opened to allow the warmed air from the heat stove H to be supplied into the air cleaner 10 through the hot air pipe 28 and then through the snorkel tube 11, and a closed position in which the opening 28a of the hot air pipe 28 is closed by the valve plate 29 to interrupt the supply of the warmed air into the air cleaner 10.

The pivotal movement of the valve plate 29 is governed by a vacuum operated motor generally identified by M and being of a construction which will now be described in details.

The vacuum operated motor M may be mounted at any suitable location inside the automobile engine compartment and is, so far illustrated, supported at the snorkel tube 11. This vacuum operated motor M comprises a valve casing 31 having its interior divided into first, second and third chambers 32, 33 and 34 by spaced first and second diaphragm members 35 and 36, the second chamber 33 being positioned between the first and third chambers 32 and 34. It is to be noted that the second diaphragm member 39 is of a type having its effective pressure receiving surface smaller than the effective pressure receiving surface of the first diaphragm member 35.

The vacuum operated motor M further comprises an operating rod 37 having one end rigidly connected to the second diaphragm member 36 and the other end operatively coupled to the valve plate 29 through an actuating lever 38 which is positioned externally of the snorkel tube 11 and which has one end rigidly mounted on the pivot shaft 30 and the other end pivotally connected to the operating rod 37. A substantially intermediate portion of the operating rod 37 extends through the first diaphragm member 35 and is so rigidly connected thereto that the first and second diaphragm members 35 and 36 can displace in unison with each other in the same direction.

So far illustrated, the vacuum operated motor M has a biasing spring 39 housed within the third chamber 34 for biasing both of the first and second diaphragm members 35 and 36 is such a direction as to cause the valve plate 29 to be held in the closed position. However, this biasing spring 39 may not be always necessary and may be eliminated if the valve plate 29 can normally be held in the closed position under the influence of a combined biasing force exerted by the respective resiliencies of the first and second diaphragm members 35 and 36.

It is to be noted that the vacuum operated motor M of the construction described above can be considered as comprised of first and second diaphragm valve assemblies, the first diaphragm valve assembly including the first diaphragm member 35 and the first and second chambers 32 and 33 while the second diaphragm valve assembly includes the second diaphragm member 36 and the third chamber 34.

While the first chamber 32 of the vacuum operated motor M is communicated to the atmosphere through a vent hole 32a, the second chamber 33 is communicated to a portion of the fuel intake passage, specifically that of the air horn 13, downstream of the throttle valve 19 through a first signaling duct 40 having one end held in communication with the second chamber 33 and the other end opening at 40a into the air horn 13. The first signaling duct 40 has a substantially intermediate portion formed with a metering orifice 41 and also has a branch passage 42 ramified from a portion of the first signaling duct 40 between the vacuum operated motor M and the metering orifice 41. The branch passage 42 has one end communicated to that portion of the signaling duct 40 and the other end connected to the air cleaner 10 and opening at 42a into the inner space of the air cleaner 10 inside the annular filtering element 12. The opening 42a of the branch passage 42 is adapted to be selectively closed and opened by a first temperature responsive valve 43 held in position to detect the temperature of the incoming air, which has been filtered through the filtering element 12, and situated within a first valve chamber 44 communicated to the inner space of the air cleaner 10 inside the filtering element 12. This first temperature responsive valve 43, which may be a thermostatic spring valve, is so designed that, when the temperature of the filtered incoming air is lower than a first preset value, for example, 50° C., the opening 42a of the branch passage 42 is closed thereby, and when it becomes equal to or higher than the first preset temperature, the opening 42a of the branch passage 42 is opened.

The third chamber 34 is communicated to a portion of the fuel intake passage, specifically that of the air horn 13, downstream of the throttle valve 19 through a second signaling duct 45 by way of a closed chamber 46 defined within the inner space of the air cleaner 10 inside the filtering element 12. More specifically, the second signaling duct 45 includes a first pipe line 45a having one end communicated to the third chamber 34 and the other end connected to the air cleaner 10 and opening at 45b into the closed chamber 46, and a second pipe line 45c having one end communicated at 45d to that portion of the air horn 13 downstream of the throttle valve 19 and the other end communicated to the closed chamber 46. The second signaling duct 45 has a second temperature responsive valve 47 positioned inside the closed chamber 46 for selectively closing and opening the opening 45b of the first pipe line 45a, that is, for selectively interrupting and establishing the communication between the first and second pipe lines 45a and 45c. The second temperature responsive valve 47 may be of a construction similar to the first temperature responsive valve 43 and is so designed that, when the temperature of the incoming air flowing externally of the closed chamber 46 is lower than a second preset value, for example, 60° C., the communication between the first and second pipe lines 45a and 45c is interrupted thereby, and when it becomes equal to or higher than the second preset temperature, such communication is established.

The second signaling duct 45 has a metering orifice 48 formed in the first pipe line 45a and also has first and second branch passages 49 and 50, the first branch passage 49 being ramified from a portion of the first pipe line 45a between the vacuum operated motor M and the metering orifice 48 and opening at 49a into a second valve chamber 51 which is in communication with the inner space of the air cleaner 10 inside the filtering element 12. The opening 49a of the first branch passage 49 is adapted to be selectively closed and opened by a third temperature responsive valve 52 held in position to detect the temperature of the filtered incoming air inside the air cleaner 10. The third temperature responsive valve 52 may be similar in construction to any one of the first and second temperature responsive valves 43 and 47 and is so designed that, when the temperature of the filtered incoming air is lower than a third preset value, for example, 80° C., the opening 49a of the first branch passage 49 is closed thereby, and when it becomes equal to or higher than the third preset temperature, the opening 49a of the first branch passage 49 is opened.

The second branch passage 50 has one end communicated to a portion of the first pipe line 45a between the metering orifice 48 and the second temperature responsive valve 47 and the other end connected to a diaphragm control valve assembly V operable to selectively open and close the auxiliary air bleed port 25a, the construction of which valve assembly V will now be described.

The diaphragm control valve assembly V comprises a valve casing 64 having its interior divided into vacuum and atmospheric chambers 53 and 54 by a diaphragm member 55, and a valving rod 56 having one end rigidly connected to the diaphragm member 55 and the other end adapted to selectively open and close the auxiliary air bleed port 25a, a substantially intermediate portion of said valving rod 56 extending axially slidably through the wall defining the carburetor C. While the atmospheric chamber 54 is communicated to the atmosphere in any known manner, the vacuum chamber 53 is communicated to the second branch passage 50 and also to the atmosphere through a bleed port 52a defined in the valve casing 64 in communication with the vacuum chamber 53. The diaphragm control valve assembly V so far illustrated further comprises a biasing spring 57 housed within the vacuum chamber 53 for biasing the valving rod 56 in such a direction as to cause the valving rod 56 to close the auxiliary air bleed port 25a.

While the heated fuel intake system embodying the present invention is constructed in the manner as hereinbefore detailed, it is to be noted that the second preset temperature for the second temperature responsive valve 47 should be higher than the first preset temperature for the first temperature responsive valve 43 and lower than the third preset temperature for the third temperature responsive valve 52.

It is also to be noted that, in the construction described above, a system including the hot air pipe 28, the valve plate 29, the first diaphragm valve assembly (including the first and second chambers 32 and 33 and the first diaphragm member 35), the first signaling duct 40, the branch passage 42 and the first temperature responsive valve 43; a system including the hot air pipe 28, the valve plate 29, the second diaphragm valve assembly (including the third chamber 34 and the second diaphragm member 36), the second signaling duct 45, the second temperature responsive valve 47, the first branch passage 49, the third temperature responsive valve 52, the second branch passage 50 and the bleed port 52a of the diaphragm control valve assembly V; and a system including the second signal conduit 45, the second temperature responsive valve 47, the second branch passage 50, the diaphragm control valve assembly V and the auxiliary air bleed port 25a constitute a first hot air introducton system, and a second hot air introduction system and an air-fuel ratio leaner system, respectively.

The operation of the heated fuel intake system of the construction described above will now be described.

Assuming that the engine E is operated and that the ambient temperature which may be the temperature either inside or outside the automobile engine compartment is lower than the first preset temperature of 50° C. for the first temperature responsive valve 43, the temperature of the air introduced from the atmosphere into the air cleaner through the snorkel tube 11 and flowing past the first temperature responsive valve 43 is so correspondingly low as to cause the first temperature responsive valve 43 to be held in position to close the opening 42a of the branch passage 42, thereby interrupting the communication between the first signaling duct 40 and the atmosphere through the branch passage 42. In this condition, the negative pressure developed in the fuel intake passage at a position downstream of the throttle valve 19 is introduced through the first signaling duct 40 to the second chamber 33 of the vacuum operated motor M, causing the first diaphragm member 35 and, hence, the operating rod 37 to displace upwards, as viewed in FIG. 1, to bring the valve plate 29 into the opened position substantially as shown. This is possible because the effective pressure receiving area of the first diaphragm member 35 is larger than that of the second diaphragm member 36 and also because the third chamber 34 is communicated to the atmosphere through a portion of the first pipe line 45a, then the second branch passage 50, the vacuum chamber 53 of the diaphragm control valve assembly V and finally through the bleed port 52a while the second and third temperature responsive valves 47 and 52 are still held in position to close the respective openings 45b and 49a.

As the valve plate 29 opens the opening 28a of the hot air pipe 28 in the manner described above, an air heated in the heat stove H in the manner described hereinbefore is introduced into the snorkel tube 11 and then into the air cleaner 10 together with air flowing from the atmosphere into the air cleaner 10 through the snorkel tube 11. Since the incoming air which has past the filtering element 12 and is ready to enter the air horn 13 is a mixture of the heated air from the heat stove H and the air from the atmosphere, the temperature of such incoming air is higher than the ambient temperature and may become equal to or higher than the first preset temperature for the first temperature responsive valve 43.

At this time, since the vacuum chamber 53 of the diaphragm control valve assembly V is communicated to the atmosphere through the bleed port 52a and the communication between the first and second pipe lines 45a and 45c is interrupted by the second temperature responsive valve 47, the auxiliary air bleed port 25a is closed by the valve rod 56, permitting only the main air bleed passage 24 to feed a portion of the warmed incoming air into the high-speed fuel passage 22.

When the incoming air flowing past the air cleaner 10 into the air horn 13 is subsequently warmed to a temperature equal to or higher than the first preset temperature of 50° C., the first temperature responsive valve 43 opens the opening 42a of the branch passage 42 to introduce the atmospheric pressure into the second chamber 33 from the air cleaner 10 through the branch passage 42 and then through the portion of the first signaling duct 40, thereby displaying the first diaphragm member 35, which has been upwardly displaced, to displace downward together with the operating rod 37 to bring the valve plate 29 into the closed position. By so doing, the supply of the hot air from the heat stove H into the snorkel tube 11 is interrupted with the opening 28a closed by the valve plate 29. In this condition, only the air from the atmosphere is permitted to enter into the air cleaner 10 through the snorkel tube 11. It is to be noted that the atmospheric pressure introduced into the branch passage 42 during the opening of the first temperature responsive valve 43 will not be introduced into a portion of the first signaling duct 40 on one side of the orifice 41 remote from the vacuum operated motor M since the orifice 41 serves to restrict it.

The above described cycle of opening and closing of the valve plate 29 is repeated depending on the temperature of the incoming air sensed by the first temperature responsive valve 43 to keep the temperature of the incoming air as constantly as possible at a valve equal to the first preset temperature for the first temperature responsive valve 43.

From the foregoing, it is clear that, unless the ambient temperature becomes equal to or higher than the first preset temperature for the first temperature responsive valve 43, only the first hot air introduction system is operated to keep the temperature of the incoming air, which is to be introduced into the engine E past the air horn 13, at a value substantially equal to the first preset temperature in such a manner as shown by a portion P of the temperature characteristic curve of the incoming air in the graph of FIG. 2. At the same time, since the air-fuel leaner system is inoperative, a portion of the incoming air flowing through the air horn 13 is permitted to enter the main air bleed passage 24 through the main air bleed port 24a to perform premixing of the air and fuel so that better atomization and vaporization are attained to provide the ultimate combustible mixture of an air-fuel ratio appropriate to the current temperature of the incoming air which has been controlled to the value substantially equal to the first preset temperature for the first temperature responsive valve 43. This ultimate combustible mixture is then introduced into the engine E in any known manner after the rate of delivery thereof has been regulated by the throttle valve 19.

However, when the ambient temperature and, hence, the temperature of the air entering the snorkel tube 11 increases subsequently to a value equal to or higher than the first preset temperature of 50° C., but lower than the second preset value of 60° C. for the second temperature responsive valve 47, the first hot air introduction system is brought into inoperative position. In other words, the first temperature responsive valve 43 is held in position to open the opening 42a of the branch passage 42 to allow the introduction of the air into the second chamber 33 of the vacuum operated motor M and, consequently, the valve plate 29 is brought into the closed position in a manner similar to that occurring when the ambient temperature is lower than the first preset temperature. Under this condition, only the air from the atmosphere is permitted to enter into the air horn 13 through the air horn 13 without being mixed with the hot air from the hot air pipe 28. The temperature of the incoming air so introduced into the air horn 13 during this condition corresponds to the ambient temperature and may increase with increase of the ambient temperature towards the second preset temperature as shown by a portion Q of the temperature characteristic curve in the graph of FIG. 2.

The subsequent increase of the ambient temperature to a value equal to or higher than the second preset temperature of 60° C. for the second temperature responsive valve 47, but still lower than the third preset temperature of 80° C. for the third temperature responsive valve 52, results in the corresponding increase of the temperature of the air entering the snorkel tube 11 and then into the air cleaner 10, causing the second temperature responsive valve 47 to open the opening 45b of the first pipe line 45a of the second signaling duct 45. When the first and second pipe lines 45a and 45c are communicated to each other in this way to complete the second signaling duct 45, the negative pressure in the fuel intake passage downstream of the throttle valve 19 is introduced into the third chamber 34 of the vacuum operated motor M through the second signaling duct 45, displacing the second diaphragm member 36 against the spring 39 together with the operating rod 37 to bring the valve plate 29 in the opened position with the heated air from the hot air pipe 28 consequently introduced into the snorkel tube 11 and then into the air cleaner 10. At the same time, the negative pressure so introduced into the second signaling duct 45 is also introduced into the vacuum chamber 53 of the diaphragm control valve assembly V through the second branch passage 50 and, therefore, the diaphragm member 55 of the diaphragm control valve assembly V is displaced against the spring 57 together with the valving rod 56 to bring the latter in position to open the auxiliary air bleed port 25a.

Upon opening of the auxiliary air bleed port 25a in the manner as hereinbefore described, another portion of the incoming air of a temperature between the second and third preset temperatures is permitted to enter through the auxiliary air bleed passage 25 into the high-speed fuel passage 22 where the premixing of the air from the main air bleed port 24a and the fuel from the fuel bowl 20 has been taking place, so that the ultimate combustible mixture to be supplied into the engine E is leaned to an air-fuel ratio appropriate to the current temperature of the incoming air then flowing through the air horn 13 towards the engine E.

At this time, since the incoming air is a mixture of the air from the atmosphere of a temperature equal to or higher than the second preset temperature of 60° C. with the heated air from the hot air pipe 28 which is generally higher than the second preset temperature, the temperature of such incoming air will readily attain a value equal to or higher than the third preset temperature of 80° C.

Should the temperature of the incoming air become equal to or higher than the third preset temperature of 80° C., the third temperature responsive valve 52 will open the opening 49a of the first branch passage 49 to allow the atmospheric pressure inside the air cleaner 10 to be introduced into the third chamber 34 through the branch passage 49, thereby displacing the second diaphragm member 36 together with the operating rod 37 to bring the valve plate 29 into the closed position to interrupt the supply of the heated air into the air cleaner 10 through the snorkel tube 11, while the negative pressure is still introduced into the vacuum chamber 53 through the second branch passage 50 to keep the auxiliary air bleed port 25a opened. In other words, during the simultaneous opening of the second and third temperature responsive valves 47 and 52 while the first temperature responsive valve 43 has already been opened, the negative pressure fed through the second pipe line 45c is introduced through the second branch passage 50 into the vacuum chamber 53 of the diaphragm control valve assembly V and the atmospheric pressure inside the air cleaner 10 is introduced into the third chamber 34 of the vacuum operated motor M. This is possible because the orifice 48 acts to restrict the flow of the atmospheric pressure in the branch passage 49 into a portion of the first pipe line 45a on one side of the orifice 48 remote from the vacuum operated motor M and, on the other hand, because the bleed port 52a in the diaphragm control valve assembly V is so sized as to allow the introduction of the air from the atmosphere into the vacuum chamber 53 at a rate lower than the rate of flow of the air inside the vacuum chamber 53 into the branch passage 50 under the influence of the negative pressure.

If the temperature of the incoming air subsequently decreases to a value lower than the third preset temperature for the third temperature responsive valve 52 as a result of the closure of the valve plate 29 which has taken place in the manner described above, the third temperature responsive valve 52 closes the opening 49a of the first branch passage 49 to interrupt the communication between the atmosphere and the third chamber 34 of the vacuum operated motor M and the negative pressure introduced through the second temperature responsive valve 47 then in the opened position is introduced into the third chamber 34 simultaneously with the introduction of the same into the vacuum chamber 53 of the diaphragm control valve assembly V. The introduction of the negative pressure into the third chamber 34 in the manner described above results in the movement of the valve plate 29 to open the opening 28a and, consequently, the temperature of the incoming air ready to enter the air horn 13 is again warmed up to a value equal to or higher than the third preset temperature. By repeating this cycle of operation of closing and opening of the third temperature responsive valve 52, the temperature of the incoming air when the embient temperature is equal to or higher than the second preset temperature for the second temperature responsive valve 47 can be maintained as constantly as possible at a value substantially equal to the third preset temperature for the third temperature responsive valve 52.

In other words, when the ambient temperature is equal to or higher than the second preset temperature of 60° C., but lower than the third preset temperature of 80° C., the second hot air introduction system is operated to maintain the temperature of the incoming air at a value substantially equal to the third preset temperature and, at the same time, the air-fuel ratio leaner system is also operated to compensate for the increased richness of the combustible mixture, that is, to lean the combustible mixture, by feeding a portion of the incoming air flowing in the air horn 13 into the auxiliary air bleed passage 25 simultaneously with the feed of a portion of the same incoming air into the main air bleed passage 24. Even though the air-fuel ratio is reduced, that is, the combustible mixture to be supplied to the engine E, in the manner described above, the air-fuel ratio is still appropriate and acceptable for the engine E to perform its proper function with the incoming air of a temperature controlled to a value substantially equal to the third preset temperature as shown by a still another portion R of the temperature characteristic curve in the graph of FIG. 2.

While the heated fuel intake system embodying the present invention functions in the manner as hereinbefore described, it is to be noted that, during the supply of the incoming air towards the engine E past the air horn 13 when the ambient temperature is higher than the first preset temperature of 50° C., but lower than the second preset temperature, the temperature of the incoming air may become equal to the ambient temperature and the air-fuel mixture formed by mixing the fuel from the main nozzle 21 with the such incoming air tends to be enriched. This is particularly true where the carburetor C, particularly the high-speed fuel circuit including the fuel passage 22, is so designed as to produce the combustible mixture of an air-fuel ratio appropriate for the engine E to operate its proper function with the incoming air of a temperature substantially equal to the first preset temperature. This tendency of the combustible mixture being enriched occurs because the density of the incoming air is lower at a higher temperature than at the temperature at which a preferable air-fuel ratio is attained, that is, 50° C. in the example described above.

In addition, it is also to be noted that, in practice, the temperature of the incoming air even though controlled by substantially cyclically permitting and interrupting the supply of the heated air into the snorkel tube 11 through the opening 28a during the period in which the ambient temperature is lower than the first preset temperature fluctuates between maximum and minimum values relative to the first preset temperature of 50° C., as shown in the graph of FIG. 3. Accordingly, the second preset temperature for the second temperature responsive valve 47, which has been described as higher than the first preset temperature, should be of a value larger than, preferably slightly larger than, the sum of the first preset temperature plus the difference, shown by T in the graph of FIG. 3, between the maximum possible temperature of such incoming air and the first preset temperature, or otherwise any possible undesirable interference in function would occur between the first and second temperature responsive valves 43 and 47 to such an extent as to warm the incoming air to a temperature approximating to the third preset temperature. It is to be noted that, if the incoming air is warmed to a temperature approximating to the third preset temperature during this condition, the charge efficiency for the engine E would undesirably be reduced. Thus, because of the second preset temperature so selected relative to the first preset temperature as hereinbefore described, there is no possibility that the second hot air introduction system prematurely operates under the condition described above.

In the foregoing embodiment of the present invention described with particular reference to FIG. 1, the air-fuel ratio leaner system has been described as operatively associated with the high-speed fuel circuit and, for this purpose, the auxiliary air bleed passage 25 has been described as connected to the fuel passage 22 in parallel relation to the main air bleed passage 24. However, it may be used in association with any known idle and low speed fuel circuit which is also equipped in the carburetor C together with the high speed fuel circuit. The application of the air-fuel ratio leaner system to the idle and low speed fuel circuit is shown in, and will be described with reference to, FIG. 4.

Figure 4:
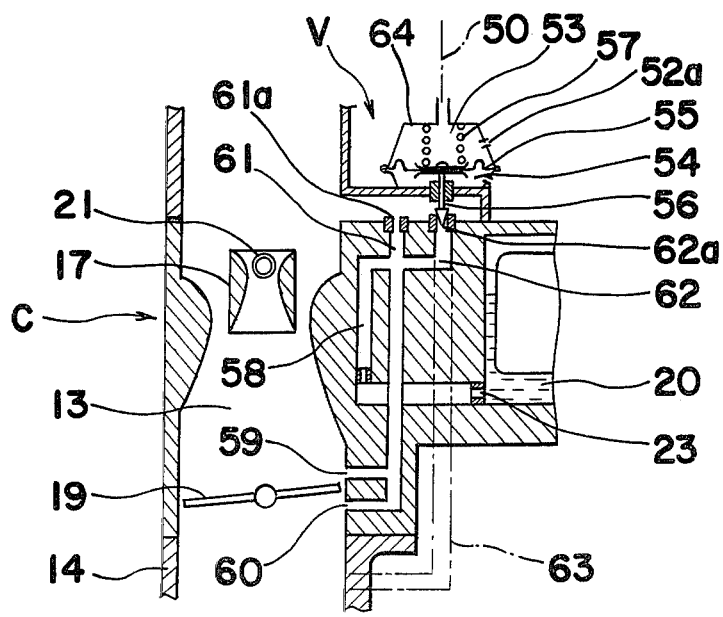
FIG. 4 is a schematic sectional view of a portion of the heated fuel intake system showing another preferred embodiment of the present invention.

Referring now to FIG. 4, the carburetor C further has an idle and low speed fuel passage 58 having one end communicated to the fuel bowl 20 and the other end branched to a low speed port 59 and to an idle port 60, said low and idle ports 59 and 60 being positioned relative to the throttle valve 19 in the manner well known to those skilled in the art, and an idle air bleed passage 61 having one end communicated to the air horn 13 at a position upstream of the venturi 21 through an idle air bleed port 61a and the other end communicated to a substantially intermediate portion of the idle and low speed fuel passage 58.

In order for the incoming air flowing through the air horn 13 to be introduced into the idle and low speed fuel passage 58 separately of the air introduced thereinto through the idle air bleed passage 61, an auxiliary idle air bleed passage 62 is employed in accordance with the present invention. This auxiliary idle air bleed passage 62 has one end communicated to the air horn 13 at a position upstream of the venturi 17 through an auxiliary idle air bleed port 62a and the other end communicated to the idle and low speed fuel passage 58, particularly to the junction of the idle air bleed passage 61 with the fuel passage 58 as shown.

The valving rod 56 which has been described as used to selectively open and close the auxiliary air bleed port 25a of the auxiliary air bleed passage 25 in the foregoing embodiment shown in FIG. 1 is, in the embodiment shown in FIG. 4, utilized to selectively open and close the auxiliary idle air bleed port 62a.

Even the system shown in and described with reference to FIG. 4 functions in a manner substantially similar to that described and shown in FIG. 1.

It is to be noted that, if desired, the auxiliary idle air bleed passage 62 may not be communicated to the idle and low speed fuel passage 58 and may, instead, be communicated to a portion of the air horn 13 or the intake manifold 14 downstream of the throttle valve 19 in a manner as shown by the phantom line 63 in FIG. 4.

From the foregoing full description of the present invention made in connection with the preferred embodiments thereof, it has now become clear that, irrespective of change in ambient temperature, not only can the combustion condition in the engine E be maintained uniformly, but also the drivability of the engine and the reduction of the unburned components of the exhaust gases emitter from the engine can be favorably improved.

Although the present invention has fully been described with reference to the accompanying drawings, it is to be noted that various changes and modifications are apparent to those skilled in the art without departing from the true scope of the present invention. By way of example, instead of selectively opening and closing the auxiliary air bleed port 25a in the case of the embodiment of FIG. 1 and the auxiliary idle air bleed port 62a in the case of the embodiment of FIG. 4, the valving rod 56 may be used to regulate the flow of the fuel from the fuel bowl into the high speed fuel circuit in the case of the embodiment of FIG. 1 and the idle and low speed fuel circuit in the case of the embodiment of FIG. 4.

Although the first and second diaphragm valve assemblies have been described as constituting a single integer of the vacuum operated motor M, the latter may be constituted by separate diaphragm valve assemblies positioned one above the other and operatively coupled to each other.

Moreover, means may be provided to advance the ignition timing of the engine ignition system in association with the second hot air introduction system incident to opening of the second temperature responsive valve 52.

Such changes and modifications are to be construed as included within the true scope of the present invention unless they depart therefrom.

I claim:

1. In an automobile internal combustion engine comprising an air cleaner, an intake passage leading from the air cleaner to the engine for the passage of air therethrough to the engine from the atmosphere by way of the air cleaner, a fuel supplying means for introducing a controlled amount of fuel into the intake passage, a heated fuel intake system which comprises:
   a heating means for heating the air to a predetermined temperature when the temperature of the atmosphere is lower than the predetermined temperature, and heating the air to another predetermined temperature when the temperature of the atmosphere is higher than the predetermined temperature and lower than the another predetermined temperature; and
   means for compensating for the increased richness of the air-fuel mixture to be fed to the engine when the temperature of the atmosphere is higher than the predetermined temperature.

2. In an automobile internal combustion engine comprising an air cleaner, an intake passage for supplying air from the air cleaner to the engine, a fuel supplying means for introducing a controlled amount of fuel into the intake passage during an engine operating condition, and an exhaust passage leading from the engine to the atmosphere for the emission of exhaust gases resulting from combustion of the combustible mixture, a heated fuel intake system which comprises, in combination:
   a first means for heating the air to a first predetermined temperature and for stopping the heating of the air when the temperature of the air has become a value equal to or higher than the first predetermined temperature;
   a second means operable when the temperature of the air from the air cleaner has attained a value equal to or higher than a second predetermined temperature higher than the first predetermined temperature for heating the air to a third predetermined temperature higher than the second predetermined temperature and for stopping the heating of the air when the temperature of the air has become a value equal to or higher than the third predetermined temperature; and
   means operable in synchronism with said second means for compensating for the increased richness of the combustible mixture to be fed to the engine.

3. An engine as claimed in claim 2, wherein the second predetermined temperature is selected to be higher than the maximum possible temperature of the air which has been heated by the second means.

4. In an automobile internal combustion engine comprising a source of air, an intake passage leading from the air source to the engine, a carburetor disposed on the intake passage and having a fuel supply circuit for introducing a controlled amount of fuel into the intake passage during an engine operating condition, and a throttle valve disposed in the fuel intake passage fo regulating the rate of delivery of a combustible mixture of the air and the fuel towards the engine, and an exhaust passage leading from the engine to the atmosphere for the emission of exhaust gases resulting from combustion of the combustible mixture, a heated fuel intake system which comprises, in combination:
   a common source of heat energies;
   a first means for applying the heat energies from the common heat energy source to the air from the air source to heat the air to a first predetermined temperature and for interrupting the application of the heat energies to the air when the temperature of the air has become a value equal to or higher than the first predetermined temperature;
   a second means operable when the temperature of the air from the air source has attained a value equal to or higher than a second predetermined temperature higher than the first predetermined temperature for applying the heat energies to the air to heat the latter to a third predetermined temperature higher than the second predetermined temperature and for interrupting the application of the heat energies to the air when the temperature of the air has become a value equal to or higher than the third predetermined temperature; and
   means operable in synchronism with said second applying means for compensating for the increased richness of the combustible mixture to be fed to the engine.

5. An engine as claimed in claim 4, wherein the air source comprises an air cleaner communicated to the intake passage and having an air intake tube extending outwardly from the air cleaner and opening towards the atmosphere, and wherein said common heat energy source comprises a heat stove including a shroud, which is disposed around the exhaust passage for collecting a heated air heated in contact with the exhaust passage during operation of the engine, and a hot air pipe having one end communicated to the shroud and other end opening into the air intake tube and being for the passage of the heated air from the heat stove to the air cleaner therethrough, said heated air from the heat stove providing the heat energies, said air intake tube having a valve plate disposed therein for selectively permitting and interrupting the communication between the heat stove and the air cleaner through the hot air pipe and the air intake tube, said valve plate being operatively coupled to the first and second applying means.

6. An engine as claimed in claim 5, wherein said first applying means comprises a first diaphragm valve assembly having a first diaphragm member defining at least one working chamber therein and a first operating rod displaceable together with the first diaphragm member and operatively coupled to the valve plate, a first vacuum conduit having one end communicated to the working chamber and the other end communicated to a portion of the intake passage downstream of the throttle valve with respect to the direction of flow of the combustible mixture towards the engine and a first valving means for controlling substantial introduction of negative pressure inside the intake passage into the working chamber, said first valving means being operable to stop the introduction of the negative pressure when the temperature of the air inside the air cleaner becomes equal to or higher than the first predetermined temperature, said first diaphragm member when said first valve means introduces the negative pressure into the working chamber thereby causing the first operating rod to bring the valve plate in position to permit the communication between the heat stove and the air cleaner to heat the air inside the air cleaner, and wherein said second applying means comprises a second diaphragm valve assembly having a second diaphragm member defining at least one working compartment therein and a second operating rod displaceable together with the second diaphragm member and operatively coupled to the valve plate, a second valving means for introducing negative pressure inside the intake passage into the working compartment when the temperature of the air inside the air cleaner becomes equal to or higher than the second predetermined temperature, and a third valving means for stopping the introduction of the negative pressure into the working compartment when the temperature of the air becomes equal to or higher than the second predetermined temperature, said second diaphragm member when the negative pressure is so introduced into the working compartment causing the second operating rod to bring the valve plate in position to establish the communication between the heat stove and the air cleaner.

7. An engine as claimed in claim 6, wherein said compensating means comprises a diaphragm control valve assembly for controlling the rate of delivery of the fuel through the fuel supply circuit in the carburetor, said diaphragm control valve assembly comprising a valve casing and a third diaphragm member defining at least a vacuum chamber within the valve casing, the negative pressure inside the intake passage being introduced into the vacuum chamber by the second valving means when the temperature of the air inside the air cleaner becomes equal to or higher than the second predetermined temperature, said diaphragm control valve assembly when the negative pressure is introduced into the vacuum chamber by the second valving means controlling the rate of delivery of the fuel through the fuel supply circuit for compensating for the increased richness of the combustible mixture.

8. An engine as claimed in claim 7, wherein the fuel supply circuit in the carburetor is a high speed fuel circuit including a main fuel passage for supplying the fuel into the intake passage at a position upstream of the throttle valve, and a main air bleed passage for introducing an air into the main fuel passage, wherein said diaphragm control valve assembly further comprises a valving rod having one end rigidly secured to the third diaphragm member, and said compensating means includes an additional air bleed passage for introducing an additional air into the main fuel passage, the other end of the valving rod being adapted to selectively open and close said additional air bleed passage, whereby the regulation of the fuel to be fed into the intake passage through the fuel supply circuit for compensating for the increased richness of the combustible mixture is carried out by regulating the rate of delivery of the fuel through the fuel supply circuit relative to the additional air fed through the additional air bleed passage.

9. An engine as claimed in claim 7, wherein the fuel supply circuit is an idle and low speed fuel circuit including an idle and low speed fuel passage for supplying the fuel into the intake passage at a position proximate to the throttle valve and an idle air bleed means for introducing an air into the idle and low speed fuel passage, wherein said diaphragm control valve assembly further comprises a valving rod having one end rigidly secured to the third diaphragm member, and said compensating means includes an additional air bleed passage for introducing an additional air into the idle and low speed fuel passage, the other end of the valving rod being adapted to selectively open and close said additional air bleed passage, whereby the regulation of the fuel to be fed into the intake passage through the fuel supply circuit for compensating for the increased richness of the combustible mixture is carried out by regulating the rate of delivery of the fuel through the fuel supply circuit relative to the additional air introduced through the additional air bleed passage.

10. An engine as claimed in claim 7, wherein the compensating means includes an air bypass passage having one end communicated to the intake passage at a position upstream of the location where the fuel is introduced into the intake passage through the fuel supply circuit and the other end opening into the fuel intake passage at a position downstream of the throttle valve, and wherein the diaphragm control valve assembly further comprises a valving rod having one end rigidly secured to the third diaphragm member and the other end adapted to selectively open and close the air bypass passage, whereby the regulation of the rate of delivery of the fuel through the fuel supply circuit for compensating for the increased richness of the combustible mixture is carried out by leaning the combustible mixture with the air fuel fed through the air bypass passage during the opening of said bypass passage.

11. An engine as claimed in claim 6, 7, 8, 9 or 10, wherein the first and second diaphragm valve assemblies comprises a common valve casing, the interior of said common valve casing being divided into at least two chambers with the second diaphragm member positioned between the common valve casing and the first diaphragm member, one of said two chambers being the working chamber positioned between the first and second diaphragm members while the other of said two chambers is the working compartment positioned on one side of the second diaphragm member opposite to the first diaphragm member, said first and second operating rods being connected together in alignment with each other.

12. An engine as claimed in claim 4, 5, 6, 7, 8, 9 or 10, wherein the second predetermined temperature is selected to be higher than the maximum possible temperature of the air inside the air cleaner which has been heated by the first applying means.

13. An engine as claimed in claim 11, wherein the second predetermined temperature is selected to be higher than the maximum possible temperature of the air inside the air cleaner which has been heated by the first applying means.

* * * * *